United States Patent [19]

Shubert

[11] 3,856,668
[45] Dec. 24, 1974

[54] METHOD FOR TREATMENT OF COAL WASHERY WATERS

[76] Inventor: Roland H. Shubert, 11530 Hickory Cluster, Reston, Va. 22090

[22] Filed: May 30, 1973

[21] Appl. No.: 365,202

[52] U.S. Cl.................. 210/21, 210/44, 210/54, 209/5
[51] Int. Cl............................................. B01d 11/00
[58] Field of Search............ 210/21, 23, 43, 54, 44; 209/5, 49

[56] References Cited
UNITED STATES PATENTS

| | | | |
|---|---|---|---|
| 2,903,423 | 8/1959 | Mondria et al. | 210/44 X |
| 3,148,140 | 9/1964 | Kaiser et al. | 210/21 |
| 3,210,170 | 10/1965 | Van't Spijker et al. | 210/21 X |
| 3,268,071 | 8/1966 | Puddington et al. | 210/43 X |
| 3,276,995 | 10/1966 | McDonald, Jr. | 210/23 X |

OTHER PUBLICATIONS

Siranni et al, Recent Experience with the Sperical Agglomeration Process, The Canadian Journal of Chemical Engineering, Vol. 47, Apr. 1969, pp. 166–170.

Capes et al, Beneficiation and Balling of Coal, Transactions, Society of Mining Engineers, AIME, Vol. 247, Sept. 1970, pp. 233–236.

Capes et al, Agglomeration of Coal Preparation, Proceedings of the Institute for Briquetting and Agglomeration, Vol. 12, Aug., 1971, Vancouver, British Columbia, Canada, pp. 53–65.

Primary Examiner—Frank A. Spear, Jr.
Assistant Examiner—Ferris H. Lander

[57] ABSTRACT

Coal washery waste waters are clarified in a two-step process in which coal particles are first agglomerated and removed from the water. Thereafter, the inorganic mineral constituents contained in the waste water are separated to leave a clarified water stream suitable for reuse. Agglomeration of the coal particles is accomplished by intense mixing of a heavy hydrocarbon, preferably in the form of a water emulsion, with the washery waste water.

12 Claims, 2 Drawing Figures

METHOD FOR TREATMENT OF COAL WASHERY WATERS

BACKGROUND OF THE INVENTION

In recent years, approximately half of the coal mined in this country was subjected to some form of wet cleaning treatment. A variety of treating methods are used including jigs, concentrating tables, classifiers, launders and dense media processes. One thing all of these wet cleaning processes have in common is the generation of waste water streams. These coal washery waste waters, often called "black water," contain in suspension very finely divided coal particles, clays, shale particles and other mineral constituents associated with coal or coal ash. Particle size of the coal and inorganic constituents suspended in the waste waters is typically very small with a substantial portion being finer than 325 mesh or about 44 microns.

These waste waters are difficult to treat and are usually passed to settling ponds or lagoons, often arranged in series, where most of the large particles slowly settle. Waste waters so treated are usually satisfactory for recycle to the cleaning treatment being utilized but seldom are the waters sufficiently clarified as to allow disposal into streams or other surface waters. Only infrequent attempts have been made to recover the coal content of these waters. Generally such attempts have involved some type of froth flotation process. One example of a presently used system for disposing of such waste waters involves passing the waste through a spiral classifier to recover any large particles of coal. The waste water is then passed to a thickener where a fine sludge fraction is removed and a recycle water stream is recovered. The fine sludge is pumped to a retaining basin which is periodically dredged with the waste being transported to a disposal site.

The solids which settle in the ponds or lagoons are slow to consolidate and dry and present a potential water pollution hazard so long as they remain in place. Most settling ponds or lagoons are formed by building an earth fill type dam often constructed of coal mine refuse. Since most disposal areas are placed in natural drainage ways such as stream valleys, they are vulnerable to storm damage and flooding and so present a semi-permanent hazard to down stream areas.

It has been proposed before to treat coal washery waters by flocculation to recover a clarified water product. This approach is illustrated by U.S. Pat. No. 3,717,574 which uses a combination of a low molecular weight anionic polymer and a high molecular weight anionic polymer with pH adjustment to clarify black waters. No separation of the coal fraction and the ash or inorganic fraction is achieved by use of this technique.

It is also known to agglomerate coal by the use of various hydrocarbons. This is perhaps best illustrated by the so-called Convertol Process represented by U.S. Pat. Nos. 2,744,626; 2,769,537; 2,769,538; 2,781,904; 2,842,319; 2,859,917 and 3,045,818. In the Convertol Process, particulate coal is intimately mixed with a hydrocarbon such as oil or tar in a kneading type of operation. After the oil treatment, the solids are dispersed in water and agglomerated coal particles are then separated from the mixture. Selective agglomeration of one constituent of a mixture of suspended solids is also known as shown by the Puddington et al U.S. Pat. No. 3,268,071. A review of selective agglomeration processes is found in *Chemical Engineering*, Jan. 27, 1969, pages 88–92.

SUMMARY OF THE INVENTION

I have found that waters containing finely divided coal and inorganic matter, such as are produced as a waste in coal washery plants, may be clarified and substantially freed of suspended solids using a two-step process in which coal particles are removed in the first step and inorganic mineral constituents are removed in a second step. Coal is removed in the first step by agglomerating the coal to form relatively large flocs or clumps. The agglomerates float on water in spite of the fact that the specific gravity of coal is substantially greater than that of water.

Agglomeration is accomplished by treating the black water waste with a heavy hydrocarbon oil while subjecting the mixture to agitation of sufficient intensity to coat the coal particles with the hydrocarbon and to cause collisions between coated coal particles. The coal particles clump together forming agglomerates which are substantially free of the particulate, inorganic mineral matter. Separation of the coal agglomerates from the water suspension of inorganic mineral matter may then be accomplished in several different ways. Filtration through a relatively coarse medium such as a fine screen retains the coal agglomerates as a cake while passing the water and suspended mineral constituents.

Another separation technique involves passing the water slurry containing coal agglomerates and inorganic matter in suspension to a separation zone, such as a settling tank, wherein coal agglomerates float to the top. A coal fraction is removed from the top of the separation zone and a water fraction containing suspended inorganic matter is removed from a lower portion of the zone. The water fraction is further treated, preferably by settling, to produce a water stream substantially free of suspended matter. Settling of the inorganic matter occurs rapidly once the coal is removed, the water usually reaching a state of substantial clarity within 30 minutes to an hour without the use of flocculating aids.

Coal agglomerates removed from the separation zone display a relatively low ash content and high calorific value since they contain essentially all of the hydrocarbons used in the agglomeration. The agglomerates dewater readily and may be dried and used as a fuel. Generally the coal agglomerates display sulfur contents lower than that of the as-mined coal since much of the pyrite content is removed along with other inorganic mineral constituents. Since coal is removed from the waste water, there also occurs a substantial decrease in the volume of sludge waste.

Hence it is an object of my invention to clarify waters containing in suspension finely divided coal and inorganic constituents associated with coal.

It is another object of my invention to recover a clarified water stream from coal washery wastes.

A further object of my invention is to reduce the volume of coal washery wastes while recovering a usable coal fraction.

DETAILED DESCRIPTION OF THE INVENTION

Figure 1:
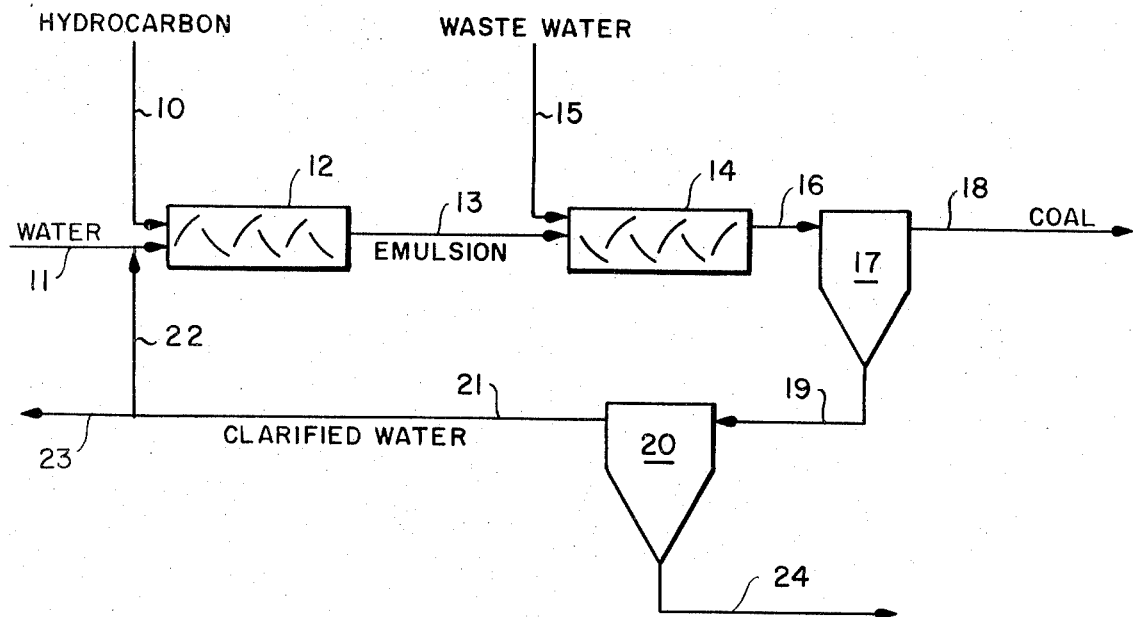
FIG. 1 is a diagrammatic flow sheet depicting a preferred embodiment of my process.

Waste waters produced in the wet cleaning of coal are black in appearance and usually contain from about 5 to 25% of finely divided solids in suspension. The solids consist of coal fines and mineral matter such as clay, shale, pyrite and the like which are associated with the mined coal. A substantial portion, often 90% or more, of the suspended solids are smaller than 325 mesh or about 44 microns. This suspended matter will slowly settle and a portion of the contained water can be recovered in a relatively clarified form. However the settled solids or sludge is very slow to consolidate and dry out and retains a substantial amount of water indefinitely.

I have found that such coal containing waste waters may be rapidly and economically clarified by first selectively removing the coal particles from suspension. Coal particles in combination with inorganic matter seem to inhibit settling and consolidation of the suspension. After coal particles are removed, the inorganic matter settles rapidly to form a dense, consolidated sludge. As a result, substantially smaller volumes of sludge requiring disposal are produced. Part of the sludge volume reduction is of course attributable to the removal of the coal fraction but additional sludge volume reduction occurs because of the more dense and consolidated sludge formed. The clarified water which is recovered is suitable for reuse in the coal washery process.

Coal removal is accomplished by an agglomeration step in which a heavy hydrocarbon is added to the coal containing suspension with agitation or mixing of sufficient intensity to selectively coat coal particles with the hydrocarbon and cause collisions between coal particles so as to form clumps or agglomerates. The agglomerated coal particles display an apparent apecific gravity of less than 1 and so will float to the top of the water upon cessation of the agitation. Individual coal particles making up an agglomerate of course have a true specific gravity substantially greater than 1 and hence will normally sink in water. Exactly why the coal agglomerates float is not clear but it is believed that extremely small air bubbles are physically entrapped between and amoung the coal particles making up an agglomerate. The hydrocarbon appears to act as a low strength glue or cement holding individual coal particles together. Whatever the explanation, the coal agglomerates rise to the surface of the water to form a concentrated mass which can easily be separated from the water and non-coal particulate matter. This phenomenon is distinguished from froth flotation in that no frothing agents are used and the coal agglomerates formed are quite dense and remarkably stable. There is no froth to break and the agglomerates will continue to float on water for an extended period of time; in some cases as long as several months.

Hydrocarbons used to agglomerate coal particles in my process may be chosen from the group of heavy fuel oils, waste lube oils and coal tar. Examples of heavy fuel oils useful in my process include those sold under the commercial designations of No. 6 fuel oil, Bunker C oil, and residual oils commonly used as fuel. Waste lube oils include crankcase drainings, industrial waste lube oils and the like. These waste oils are often heavily contaminated with carbon particles and water but such contaminants are not detrimental to the process. Coal tar is that obtained from the coking of coal.

Only enough hydrocarbon need be used to agglomerate the coal particles sufficiently to allow their separation and removal from the slurry. Hydrocarbon requirements appear to be a function of coal particle size, the finer the coal the more hydrocarbon required, and upon the characteristics of the hydrocarbon used. Generally about 2 to 10% by weight of hydrocarbon based upon coal content is appropriate. When using heavy residual fuel oils, about 3 to 7% by weight of fuel oil based upon weight of the coal in the waste slurry gives good results. Similar ranges are appropriate when using waste lube oils such as crankcase drainings while somewhat smaller amounts of coal tar can be used. In all cases, excess hydrocarbon is not detrimental; in fact quantities as high as 20% or more may be used but little if any advantage is gained by use of such larger amounts.

I prefer to introduce the hydrocarbon into the coal waste water in the form of a water emulsion. Suitable emulsions may be easily formed in a conventional fashion; by intense agitation of water to which is added the hydrocarbon, by passing an oil-water mixture through a homogenizing valve, by use of an in-line mixer either of the dynamic or motionless type or by other techniques known in the art. The emulsion need not be stable since it may be merged with the coal waste water immediately after formation. By first forming an emulsion there is obtained a faster and more uniform mixing of the hydrocarbon with the waste water and a decrease in the amount of hydrocarbon required to produce the same degree of agglomeration. Concentration of hydrocarbon in the water emulsion may vary over a wide range, from as little as about 1% by volume up to the maximum amount of hydrocarbon that can be contained in the emulsion and still maintain water as the continuous phase. In a practical sense, hydrocarbon content of the emulsion is determined by whether or not it is desired to dilute the waste water. Waste waters with high solids content, especially a high content of inorganic mineral constituents, are preferably diluted in order to enhance speed of separation of flocculated coal from the suspension of ash materials in water. Generally I prefer to dilute concentrated waste waters to a level whereat the solids concentration is in the range of about 10 to 15%.

In a less preferred but workable embodiment, the hydrocarbon may be introduced directly into the waste water slurry. The hydrocarbon should be introduced directly into the mixing zone or zone of intense agitation. This may be accomplished by spraying the hydrocarbon onto the surface of the liquid slurry in an agitated zone such as that created by a turbine-type mixer. Spray nozzles such as those designed for the introduction of fuel oils into furnaces may be used for this purpose. Since the hydrocarbons contemplated for use in my process are generally viscous, often having the consistency of thick syrup at room temperature, it is advantageous to heat the hydrocarbon to a temperature of 150° to 200°F or even higher in order to reduce its viscosity prior to either emulsification or introduction into the slurry by spraying. Introduction of the heavy hydrocarbon in a heated state appears to aid the dispersion of the hydrocarbon onto the surface of the coal particles and decreases the amount of hydrocarbon required for flocculation.

Referring now to FIG. 1, there is shown a diagrammatic flow sheet of an embodiment of my process. A hydrocarbon stream 10, such as a heavy fuel oil or waste lube oil, and a water stream 11 are introduced into emulsifying means 12. Means 12 preferably comprises an inline motionless mixer which is a no-moving-part duct like mixing device having stationary flow dividing and mixing elements. Other apparatus such as homogenizing valves or mechanical mixers may be used as well. An oil-in-water emulsion 13, produced in means 12, is then passed to agitation means 14 along with a waste water stream 15 containing coal particles and inorganic mineral constituents in suspension. Agitation means 14 preferably comprises an inline mixer of the motionless type of similar design but larger capacity than mixer 12. However, means 14 may also comprise a dynamic inline mixer or a mixing device of the turbine or propeller type.

As a result of agitation in means 14, hydrocarbon droplets contained in emulsion 13 are dispersed on the surface of coal particles. Inorganic particles are unaffected by the hydrocarbon, probably because of the preferential wetting characteristics of the hydrocarbon toward the coal particles. Coal particles are agglomerated into larger masses and the hydrocarbon treated slurry 16 is then passed to separation means 17 wherein agglomerated coal particles are removed from the other slurry constituents. Separation means 17 may comprise a quiescent zone such as a settling vessel wherein the agglomerated coal masses float to the surface and the inorganic constituents tend to settle to the bottom. Detention time within such a settling vessel need be but a very short time, on the order of a few minutes, since separation of the coal flocs from the other constituents occurs very rapidly. A coal fraction 18 is removed from separation means 17 and may be further processed by dewatering and drying if desired.

Instead of a settling vessel, means 17 may comprise other apparatus for removing agglomerated coal particles from the other slurry constituents. It is possible to perform an effective separation by screening or filtering slurry 16 through a relatively coarse medium such as stainless steel or fabric screening of about 100 to 200 mesh. Essentially all of the coal agglomerates are retained on such a screen while the water containing inorganic constituents in suspension passes readily through.

A water suspension of inorganic constituents 19 is removed from a lower portion of separation means 17 and is passed to settling means 20. Means 20 may comprise a settling vessel similar to means 17 or may comprise a settling basin or lagoon. Detention times in means 20 may be relatively short but are greater than those required in means 17. Settling times of one half to several hours produces a water stream 21 substantially devoid of suspended materials without the use of flocculating aids. A portion 22 of clarified water stream 21 may be used to form the hydrocarbon-water emulsion while the remainder 23 may be reused in a coal processing plant.

A settled sludge fraction 24 may be removed from a lower portion of means 20. This sludge fraction contains most of the non-coal mineral constituents of the waste water stream and comprises a waste material. It is preferred to dispose of this waste by pumping or otherwise transporting it to a section of abandoned mine workings. Alternatively, sludge fraction 24 may be allowed to accumulate and consolidate in a lagoon or settling basin.

If desired, coal fraction 18 may be further treated by reslurrying it in water and subjecting it to a second separation such as that performed in means 17. This further reduces the amount of inorganic or ash constituents in the coal fraction and enhances its value as a fuel. The coal fraction dewaters easily by vacuum filtration or other conventional techniques it may then be thermally dried without the severe dusting problems normally encountered with coal of this particle size.

The following examples serve to more fully illustrate my invention.

EXAMPLE 1

A sample of black water was obtained from a bituminous coal preparation plant. The black water had a solids content of about 24% and the solids had an ash content of 27.9% as determined by ignition. A quantity of No. 6 residual fuel oil, used as a fuel in a commercial heating plant, was also obtained. The fuel oil had a viscosity at room temperature comparable to thick syrup, was black in appearance and had a mild odor.

A portion of the black water sample at ambient temperature was placed in a propeller or turbine-type mixer and agitated at high speed for about 1 minute to thoroughly mix and homogenize the sample. Portions of residual fuel oil, heated to a temperature of about 150°F, were added to the black water slurry in a stepwise fashion with agitation. Definite agglomeration of the coal particles in the slurry was observed by the time residual fuel oil addition amounted to 0.5% of the volume of the black water slurry. This was equivalent to about 2 to 3% by weight of residual fuel oil based on coal content of the black water.

Residual fuel oil addition was continued until the level reached about 0.7% by volume of the black water slurry. Mixing was then stopped and the sample was allowed to settle. Coal agglomerates having a size of about 1/32 to 1/16 inch were dispersed in a deep gray matrix liquid. The matrix liquid, comprising the inorganic or ash materials contained in the black water, was too thick to allow the coal agglomerates to separate completely and rise to the surface.

The sample was then diluted with tap water in an amount equal to 50% of the original black water volume and again agitated. Segregation of the coal agglomerates at the surface of the slurry proceeded much more rapidly and completely than before. Additional residual fuel oil, in an amount equal to about 0.7% of the original volume of the black water, was then added with a high rate of agitation. This had the effect of increasing the size and apparent density of the coal agglomerates.

Coal agglomerates were then removed from the slurry by filtration through a very coarse filter paper. Inorganic materials suspended in the water passed readily through the filter paper while coal agglomerates were completely retained. Most of the solids, both inorganic material and coal, in the original black water sample would readily pass through the same filter. The filter cake comprising mostly coal, and the filtrate comprising a water suspension of finely divided inorganic solids, were retained for further processing.

EXAMPLE 2

The filtrate from Example 1 was placed in a cylinder and allowed to settle. There rapidly developed a very sharp interface between the settling sludge and supernatant liquid. The supernatant water was translucent and cloudy in appearance while the settling sludge was dark gray. At the end of 5 minutes, the sludge volume was about 88% of the original volume; at 10 minutes it was 36%; at 15 minutes it was 24% and at 30 minutes it was 17%.

At the end of 30 minutes of settling, the supernatant water was carefully decanted from the sludge. The water fraction was analyzed and showed a total suspended and dissolved solids content of 12.4 mg/ml. The sludge fraction contained 12.7% solids on a dry basis and the dried sludge solids showed a loss on ignition of 11.2%.

EXAMPLE 3

The coal recovered as filter cake in Example 1 was re-slurried by intense mixing for about 1 minute in clean tap water. Coal agglomerates again rose to the surface to form a thick layer floating on a milky gray water phase. A small quantity of additional hot residual fuel oil was then added with agitation. Agglomeration of the coal phase appeared to be slightly improved. The slurry was then filtered through a coarse filter paper which retained the agglomerated coal but passed the gray water readily.

The filtrate was allowed to settle undisturbed. Settling was essentially complete in 15 minutes with a settled sludge volume about ¼ to ⅓ that of Example 2. Coal recovered as filter cake was ignited and displayed an ash content of 10.14%.

EXAMPLE 4

A quantity of black water, the same as used in Example 1, was diluted with an equal volume of clear decantate from settled black water. The black water and decantate were homogenized by high speed mixing after which time a quantity of hot (90°C) No. 6 residual fuel oil was added while intense mixing continued. Agitation of the slurry was continued for 40 seconds after completion of residual oil addition. Residual fuel oil added to the slurry totaled 1% by volume of the undiluted black water or about 5% by weight of the coal contained in the black water.

Intense agglomeration of the coal occurred and, upon cessation of agitation, the coal flocs formed a thick layer at the top of the mixing vessel. After 10 minutes time, there had formed a definite three phase system; a layer of flocculated coal at the top, a gray ash residue at the bottom and a clear to translucent water layer in between. This settled mixture was then homogenized by intense mixing for 30 seconds and transferred to a decanting vessel. After two minutes settling time in the decanting vessel, the water and inorganic constituents were drawn off the bottom.

Figure 2:
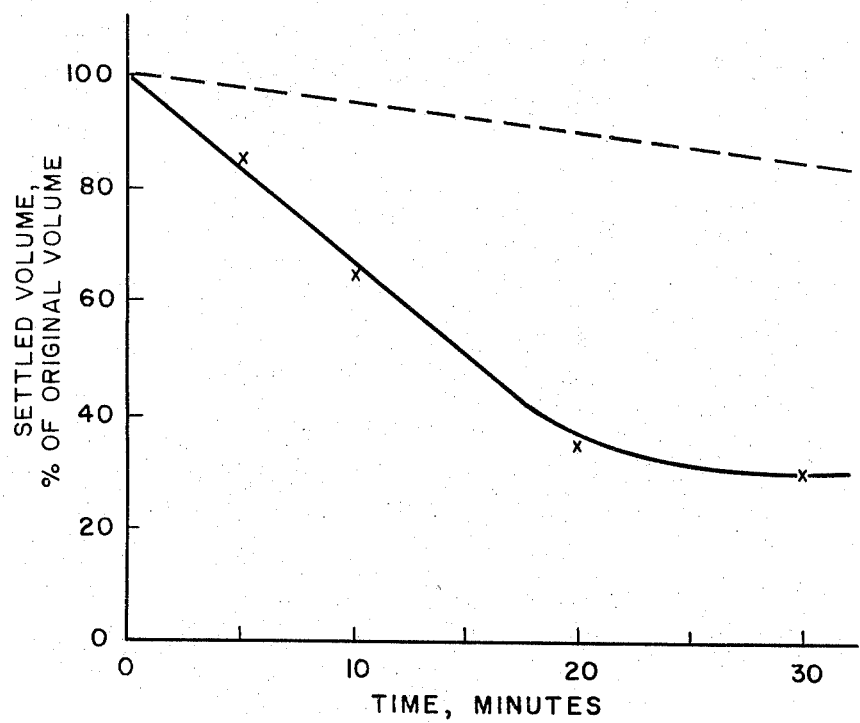
FIG. 2 is a graphical illustration of settling rates obtained by use of my process in comparison with those observed with untreated coal washery wastes. Both Figures will be discussed in detail later.

A representative sample of the water suspension of inorganic constituents was placed into a graduated cylinder and a sample of black water was placed in an identical cylinder. The two suspensions were then allowed to settle. Settling rates of the two suspensions are set out in graphical form as FIG. 2. In this Figure, the top dashed line represents the black water sample while the lower solid line represents the settling rate of the ash or inorganic constituents of black water.

EXAMPLE 5

A quantity of waste lube oil (crankcase drainings) was obtained from a service station. Four parts by volume of the waste lube oil was added to 300 parts of tap water with intense agitation to form an emulsion. Three hundred parts by volume of black water was then added to the water-oil emulsion and agitation was continued for 30 seconds after completion of the black water addition. The black water was the same as that used in Example 1 and contained about 24 wt % solids.

The sample was then allowed to settle undisturbed. Coagulated coal floated to the top in a thick layer while the water phase below was a milky gray in appearance. In less than 5 minutes, a definite three-layer configuration had developed with an ash or inorganic fraction settling in a layer on the bottom, a coal layer floating on top and a dirty water layer in between. At the end of 15 minutes, the water layer separating the coal fraction and the inorganic material was nearly clear. After one hour, the coal layer remained floating stably on the surface and some increase in clarity of the water layer was evident.

EXAMPLE 6

A black water sample from a bituminous coal treating plant different from that used in the preceding examples was obtained. A portion of the sample was placed in a propeller-type mixer and was treated with a small quantity of synthetic coal tar while the slurry was being strongly agitated. Immediate agglomeration occurred and, upon cessation of the agitation, the agglomerated coal formed a thick layer at the top of the water.

The agglomerated coal was removed from the liquid phase by filtration through a stainless steel screen of about 200 mesh. Essentially all of the particulate materials contained in the untreated black water passed readily through this screen. The filtrate settled rapidly leaving an essentially clear water fraction. A sample of water obtained by decantation after settling of the ash portion was analyzed and contained 860 ppm total dissolved and suspended solids. A portion of the coal recovered as filter cake was analyzed and displayed an ash content of 3.9% and a sulfur content of 0.83%.

I claim:

1. A method for treating a water slurry containing in suspension very finely divided coal particles and particulate inorganic materials associated with coal which comprises:

mixing with said water slurry a heavy, liquid hydrocarbon in aqueous emulsion, wherein the amount of hydrocarbon added to the waste stream is in the range of 2 to 10% by weight based upon the weight of coal particles contained in the waste stream, said hydrocarbon being chosen from the group consisting of heavy fuel oils, waste lube oils and coal tar, said mixing being accomplished by subjecting the slurry and emulsified hydrocarbon to agitation sufficiently intense to disperse the hydrocarbon on the surface of the coal particles and to cause collisions between coal particles resulting in the formation of coal agglomerates;

passing the slurry, now containing coal agglomerates and finely divided inorganic matter in suspension, to a first separation zone wherein coal agglomerates are removed;

passing the water fraction containing suspended inorganic matter to a second separation zone, and recovering from the second separation zone a clarified water fraction.

2. The method of claim 1 wherein the hydrocarbon is a waste lube oil.

3. The method of claim 1 wherein the hydrocarbon is a heavy, residual fuel oil.

4. The method of claim 1 wherein the water slurry is a waste stream generated by the wet cleaning of bituminous coal.

5. The method of claim 4 wherein the first separation zone comprises a settling zone wherein coal agglomerates are removed from an upper portion thereof and a water fraction containing suspended inorganic matter is removed from a lower portion thereof.

6. The method of claim 5 wherein the second separation zone comprises a settling zone and wherein a sludge fraction comprising inorganic materials is removed from a lower portion thereof.

7. The method of claim 6 wherein the sludge fraction is disposed of within abandoned coal mine workings.

8. The method of claim 5 wherein the slurry passed to the first separation zone has a solids concentration in the range of 10 to 15%.

9. The method of claim 8 wherein the hydrocarbon is a heavy residual fuel oil.

10. The method of claim 9 wherein the amount of residual fuel oil added to the waste stream is in the range of 3 to 7% based upon weight of coal particles contained in the waste stream.

11. The method of claim 8 wherein the hydrocarbon is a waste lube oil.

12. The method of claim 7 wherein the amount of lube oil added to the waste stream is in the range of 3 to 7% based upon weight of coal particles contained in the waste stream.

* * * * *